(12) United States Patent
Pannewitz et al.

(10) Patent No.: US 9,533,436 B2
(45) Date of Patent: Jan. 3, 2017

(54) PRESS

(71) Applicant: FETTE COMPACTING GMBH, Schwarzenbek (DE)

(72) Inventors: Thomas Pannewitz, Klein Pampau (DE); Stephan Mallon, Kollow (DE)

(73) Assignee: Fette Compacting GmbH, Schwarzenbek (FR)

( * ) Notice: Subject to any disclaimer, the term of this patent is extended or adjusted under 35 U.S.C. 154(b) by 0 days.

(21) Appl. No.: 14/404,556

(22) PCT Filed: May 29, 2013

(86) PCT No.: PCT/EP2013/001580
§ 371 (c)(1),
(2) Date: Apr. 7, 2015

(87) PCT Pub. No.: WO2013/178355
PCT Pub. Date: Dec. 5, 2013

(65) Prior Publication Data
US 2015/0217486 A1    Aug. 6, 2015

(30) Foreign Application Priority Data

May 31, 2012   (DE) .................. 10 2012 010 767

(51) Int. Cl.
*B29C 43/02*    (2006.01)
*B30B 1/18*    (2006.01)
(Continued)

(52) U.S. Cl.
CPC ................ *B29C 43/02* (2013.01); *B30B 1/18* (2013.01); *B30B 11/04* (2013.01); *B30B 15/044* (2013.01);
(Continued)

(58) Field of Classification Search
CPC ............ B29C 43/02; B30B 1/18; B30B 11/04; B29L 2031/772; B29L 2043/029
(Continued)

(56) References Cited

U.S. PATENT DOCUMENTS 3,163,105 A    12/1964   Pearson
4,873,923 A    10/1989   Manning
(Continued)

FOREIGN PATENT DOCUMENTS

| EP | 2311587 A1 | 4/2011 |
|---|---|---|
| EP | 2479022 A1 | 7/2012 |
| WO | 2008/104969 A1 | 9/2008 |

*Primary Examiner* — Joseph S. Del Sole
*Assistant Examiner* — Thukhanh T Nguyen
(74) *Attorney, Agent, or Firm* — Young Basile Hanlon & MacFarlane, P.C.

(57) ABSTRACT

A press for producing a pellet from powdered material comprises a press frame and a pressing unit arranged therein, at least one upper press punch and/or at least one lower press punch, as well as at least one receptacle for powdered material. At least one upper drive unit has at least one upper drive motor for moving the upper press punch and/or at least one lower drive unit having at least one lower drive motor for moving the lower press punch and/or the receptacle. The at least one upper drive unit acts laterally offset on the at least one upper press punch via an upper force transmission element and/or the at least one lower drive unit acts laterally offset on the at least one lower press punch and/or the receptacle via a lower force transmission element. At least one upper spring element is arranged between the upper force transmission element and the at least one upper drive unit and/or at least one lower spring element is arranged between the lower force transmission element and the at least one lower drive unit.

20 Claims, 1 Drawing Sheet

(51) Int. Cl.
  *B30B 11/04*  (2006.01)
  *B30B 15/04*  (2006.01)
  *B29L 31/00*  (2006.01)

(52) U.S. Cl.
  CPC .... *B29C 2043/029* (2013.01); *B29L 2031/772* (2013.01)

(58) Field of Classification Search
  USPC .................................. 425/78, 138, 352–355
  See application file for complete search history.

(56) References Cited

U.S. PATENT DOCUMENTS

| | | | |
|---|---|---|---|
| 5,272,904 A | | 12/1993 | Krumholz |
| 5,906,837 A | * | 5/1999 | Link ......................... B22F 5/08 |
| | | | 425/150 |
| 6,792,788 B2 | * | 9/2004 | Futamura ................ B30B 1/186 |
| | | | 100/270 |
| 7,379,783 B2 | | 5/2008 | Popp |
| 7,379,784 B2 | | 5/2008 | Popp |
| 7,392,107 B2 | | 6/2008 | Popp |
| 7,799,273 B2 | | 9/2010 | Popp |
| 8,660,680 B2 | | 2/2014 | Popp |
| 8,668,483 B2 | * | 3/2014 | Mercado .................. B30B 1/18 |
| | | | 425/138 |
| 2009/0317507 A1 | | 12/2009 | Eisenberg et al. |
| 2013/0302456 A1 | | 11/2013 | Wehrli |
| 2014/0094949 A1 | | 4/2014 | Popp |

\* cited by examiner

PRESS

FIELD OF THE DISCLOSURE

The invention relates to a press for producing a pellet from powdered material.

BACKGROUND

A press is known from International Patent Publication No. WO 2008/104969 A1. That press has a frame-formed press frame with which an upper and a lower frame plate are connected with each other using a plurality of bars at the edge, which are oriented parallel to a longitudinal axis of the press frame. A die plate, in which a receptacle is located for a powdered material to be pressed, is arranged securely connected to the press frame, and is aligned perpendicular to the longitudinal axis between the upper and the lower frame plate. A pair of guide rods, oriented in the direction of the longitudinal axis, which are arranged spaced from each other respectively in the upper and lower region of the press frame and securely fixed thereto, penetrate the die plate and a press arrangement. The press arrangement is provided for receiving and moving a press punch and is arranged respectively above and below the die plate, which is slidable on the guide rods. Two threaded pins, securely anchored at a distance from each other in the die plate, respectively engage in an assigned threaded nut, which are mounted rotatably in the upper and lower press arrangement. The two upper and the two lower pins are respectively driven by a drive motor supported by the assigned press arrangement. The upper and the lower press arrangement are movable in the vertical direction using the spindle drives, fastened to the die plate, which are driven pairwise synchronized by the respective drive motor. The drive motors for actuating the spindle drives are therefore correspondingly moved along with each vertical movement of the press arrangement. The pressing force, acting as an action force to be applied during the pressing of the powdered material respectively at the upper and lower press punch, generates in each case a reaction force, which must be absorbed via threaded pins, arranged securely pairwise above and below the die plate, and must be dissipated in the die plate. This design requires a significant dimensioning of the die plate and also the respective press arrangement in order to be able to absorb the forces and torque occurring in the course of the pressing and in the course of the movement occurring herewith of the upper and lower press arrangement.

A further press is known from European Patent Publication No. EP 2 311 587 A1. That press has a press frame having a press upper part and a press lower part and vertical support columns that connect the press upper part and the press lower part with each other. With such presses, an alignment as precise as possible of all components located in the force flow during the pressing procedure is of crucial importance for the pressing result and the wear of the press. There is a plurality of components, which are generally manufactured individually, and component levels in the force flow. Hereby, the manufacturing tolerances add up and can lead to a deformation of the components of the press due to the high pressing forces. In particular, it is possible that the axles of the upper and lower drives units for driving the upper and lower punch are not precisely flush with each other. This can lead to flawed pressing results. Additionally, this leads to increased wear of the individual components during pressing, for example, seals and guide belts of cylinders with hydraulic presses, spindles/spindle nut units with spindle presses, or guides with tool guide frames.

SUMMARY

Based on the explained prior art, an object of the invention is to provide a press including a press frame and a pressing unit arranged in the press frame, having at least one upper press punch and/or at least one lower press punch, as well as at least one receptacle for the powdered material to be pressed by the upper and/or lower press punch, at least one upper drive unit having at least one upper drive motor for moving the upper press punch in the vertical direction, and/or at least one lower drive unit having at least one lower drive motor for moving the lower press punch and/or the receptacle in the vertical direction with which an optimal pressing result is attained in a constructively simple manner, in particular minimizing the influences of a deformation of components of the press on the press result.

For a press described herein, the at least one upper drive unit acts laterally offset on the at least one upper press punch via at least one upper force transmission element, and/or the at least one lower drive unit acts laterally offset on the at least one lower press punch and/or the receptacle via at least one lower force transmission element, and at least one upper spring element, deforming during a pressing procedure, is arranged between the upper force transmission element and the at least one upper drive unit, and/or at least one lower spring element, deforming during a pressing procedure, is arranged between the lower force transmission element and the at least one lower drive unit.

The press has a press frame that stands by means of feet, or directly on the ground. A pressing unit having at least one upper press punch and/or at least one lower press punch is arranged in the press frame. The pressing unit further has a receptacle into which the powder to be pressed is filled before pressing using the press punch(es). The powdered material can be, for example, a metal or ceramic powder. The receptacle is arranged between the upper punch and the lower punch. Frequently, the press comprises at least one upper and lower punch, which interact in the receptacle for pressing the filled powder. However it is also fundamentally conceivable to provide a pressing, for example only from above using only one upper punch, if the receptacle has a closed bottom.

The upper and/or lower punches can be arranged on an upper or respectively lower punch plate. Upper and lower drive units are provided with upper and/or lower drive motors for the vertical movement of the upper and/or lower punches in the course of the pressing procedure. In principle, it is possible to provide more than one, for example, two, upper drive units having two upper drive motors and/or more than one, for example, two lower drive units having two lower drive motors. If two upper drive units and/or two lower drive units are provided, these can be disposed symmetrically, for example, on two opposing sides of the press frame. It is however also conceivable to provide only one drive unit on one side, and only one guiding unit on the opposing side. As explained, the lower drive unit can drive a lower press punch or a receptacle in the vertical direction. Thus, it is also possible to operate the press in an ejection process in which the receptacle is stationary, and the upper and lower punches are moved with respect to the receptacle, as well as in the pull-off process in which the lower punch is stationary and the receptacle and the upper punch are movable. Basically, the press according to the invention permits the number of press axes, and thus the pellets produced in parallel, to be increased within broad limits. The pressing unit can form a module, which can be removed as a whole from the press, and can be exchanged for another pressing unit also forming a module. The receptacle can be formed in a so-called die plate. It can be arranged fixed to the press frame.

The at least one upper drive unit acts laterally offset on the at least one upper press punch via an upper force transmission element, or respectively the at least one lower drive unit acts laterally offset on the at least one lower press punch and/or the receptacle via a lower force transmission element. The drive units therefore act decentrally on the press punch. The movement direction (or respectively force direction) of the drive unit(s) can be distanced in parallel to the movement direction (or respectively force direction) of the upper punch and the lower punch, or respectively the receptacle. Thus, the drive units engage, in particular non-coaxially, on the pressing unit. The force exerted by the drive unit(s) is transmitted by means of the force transmission element to the pressing unit, in particular to the upper press punch and the lower press punch, or respectively the receptacle. With the very high forces occurring in the course of the pressing procedure, as initially explained, there can be significant deformation, for example bending, in particular of the force transmission element. This in turn can lead to a tipping of parts of the drive units, whereby increased wear occurs. In order to prevent this, one or more spring elements are provided which elastically deform during the pressing procedure and thus absorb a deformation, for example bending, of the force transmission element. The spring elements are located for this purpose between the force transmission element and the upper and/or the lower drive unit. Thus, a (nearly complete) decoupling of the force transmission element from the drive units is attained such that a deformation of the force transmission element occurring during operation of the press does not lead to a tipping or similar misalignment of the drive units connected hereto. Additionally, possible tensions between different drive units of the press, arising for example due to mechanical tolerances, are compensated by the spring elements. As a result, the pressing procedure is also optimized and wear is reduced. Disk springs, diaphragms, etc., can be used as spring elements. These can consist of, for example, a metal material, a plastic, or a rubber compound.

The press frame can have an upper and a lower retaining plate, which are connected with each other by a plurality of vertical spacers. Particularly high stability is thereby attained. Here, the retaining plate and the vertical spacers can also be a welded part. The at least one drive motor of the at least one upper drive unit can be fastened to the upper retaining plate of the press frame. Correspondingly, the at least one drive motor of the at least one lower drive unit can be fastened to the lower retaining plate of the press frame. The at least one upper drive motor and/or the at least one lower drive motor are arranged on the press frame in such a manner that they do not move in a vertical direction along with a vertical movement of the upper press punch and/or the lower press punch and/or the receptacle. As a result, stability is increased and the pressing result is improved.

The upper force transmission element and/or the lower force transmission element can comprise an upper force transmission bridge extending in the horizontal direction. The force transmission bridges can be formed bar-shaped. This results in a particularly simple constructive and simultaneously uniform application of force from the drive units into the pressing unit, in particular, to the press punches, or respectively the receptacle.

According to a further design, at least two upper drive units, each having an upper drive motor, are provided that act laterally offset on the at least one upper press punch via the upper force transmission element, wherein in each case at least one upper spring element, deforming with a pressing procedure, is arranged between the upper force transferring element and the at least two upper drive units. The at least two upper drive units can engage preferably on opposing ends of the upper force transmission bridge. Correspondingly, at least two lower drive units, each having a lower drive motor, are provided that act laterally offset on the at least one lower press punch and/or the receptacle via the lower force transmission element, wherein in each case at least one lower spring element, deforming with a pressing procedure, is arranged between the lower force transmission element and the at least two lower drive units. The at least two lower drive units again can engage preferably on opposing ends of the lower force transmission bridge.

The upper force transmission bridge can be connected, for example, centrally to the upper press punch, or respectively an upper punch plate supporting the upper press punch. Correspondingly, the lower force transmission bridge can be connected, for example, centrally to the lower press punch, or respectively a lower punch plate supporting the lower press punch or the receptacle. A further upper force transmission element can be arranged between the upper force transmission bridge and the upper press punch, or respectively an upper punch plate. Correspondingly, a further lower force transmission element can be arranged also between the lower force transmission bridge and the lower press punch, or respectively a lower punch plate, or respectively the receptacle. With movement of the respective force transmission bridge driven by the upper and/or the lower drive units, the upper and/or the lower press punch, or respectively the receptacle, are then also driven. Also for example, four upper and/or four lower drive units can be provided. In this case, two drive units each engage at one end of the force transmission bridge. The engagement of the drive units on the opposing ends of the force transmission bridge leads to a particularly uniform application of force.

Naturally, in each case an upper, or respectively lower, spring element, deforming during a pressing procedure, or a plurality of upper, or respectively lower, spring elements, deforming during a pressing procedure, can be arranged between the upper, or respectively lower, force transmission element and the at least one upper, or respectively lower, drive unit. According to a particularly practical design, at least one upper flange of the at least one upper drive unit is connected to the upper force transmission element via a plurality of fastening means, wherein at least one upper spring element, deforming during a pressing procedure, forming a spacer between the upper flange and the upper force transmission element, is placed onto the fastening means. Correspondingly, at least one lower flange of the at least one lower drive unit is connected to the lower force transmission element via a plurality of fastening means, wherein at least one lower spring element, deforming during a pressing procedure, forming a spacer between the lower flange and the lower force transmission element, is placed onto the fastening means. The at least one spring element can be annular, for example. The at least one spring element then sits on the fastening means between the flange of the respective drive unit and the respective force transmission element. As a result, a partial decoupling of the force transmission element from the respective drive unit is attained in a particularly simple manner. Thus in particular, a bending, for example, of a bar-shaped force transmission bridge is allowed in a particularly simple manner, without acting disadvantageously on the drive units, in particular the alignment thereof.

In order to allow a comprehensive elastic suspension of the fastening means, at least one second upper, or respectively lower, spring element, deforming during a pressing procedure, forming a spacer between the fastening means, for example heads or nuts of the fastening means, and the upper, or respectively lower, flange or the upper, or respectively lower, force transmission element, can be placed onto the fastening means. The second spring element can also be annular. The fastening means can be placed with or without play through the respective flange, and can be screwed into the respective force transmission element. However it is also possible that the fastening means are placed with or without play through the respective force transmission element, and are screwed into the respective flange. The fastening means can be threaded bolts, for example. However, other fastening means are also possible. It is also possible that in each case at least one spring element is placed onto the fastening means. Thus, with this design, decoupling is guaranteed in each case by a plurality of spring elements.

According to a further design, the at least one upper drive motor of the upper drive unit can be at least one electric drive motor, wherein the at least one upper drive unit comprises at least one upper spindle drive, having an upper spindle nut, driven by the at least one electric drive motor, and/or the at least one lower drive motor of the lower drive unit can be at least one electric drive motor, wherein the at least one lower drive unit comprises at least one lower spindle drive with a lower spindle nut, driven by the at least one electric drive motor. Particularly precise control of the applied forces can occur with such electric spindle drives, in particular with the use of a plurality of parallel acting drive units. At the same time, very high forces can be transmitted. The at least one electric drive motor can be at least one hollow shaft motor.

The at least one upper flange can be a flange of the at least one upper spindle nut of a spindle drive. Correspondingly, the at least one lower flange can be a flange of the at least one lower spindle nut of a spindle drive. A tipping of the spindle nut due to a bending of the force transmission element is reliably avoided with this design. A particularly extensive decoupling of the respective force transmission element from the spindle nuts, and thus the drive units, is attained. The respective electric drive motor can, in particular, rotatably drive a spindle of the respective spindle drive, whereas the respective spindle nut is arranged securely on the respective force transmission element using the flange. The rotation of the respective spindle then leads to an axial movement of the respective spindle nut, which is transferred, via the flange connection, onto the respective force transmission element, and with this onto the pressing unit, in particular, to the upper, or respectively lower, press punch, or the receptacle.

According to a further design, the at least one upper spindle nut can be held locked against rotation in at least one upper receptacle of the upper force transmission element. Correspondingly, the at least one lower spindle nut can be held locked against rotation in at least one receptacle of the lower force transmission element. The lock against rotation prevents slip during drive. The lock can be implemented using a tongue and groove connection. In order to simultaneously allow tipping between the force transmission element and the drive, in particular a spindle nut, a groove and a tongue of a lock against rotation can run in the axial direction of the spindle nut. Furthermore, the groove and the tongue can be arranged on a peripheral position of the spindle nut, or respectively the receptacle, which lies on the central longitudinal axis of the force transmission element, for example, a bar-shaped force transmission bridge.

There can be a space between the inner surface of the at least one upper receptacle and an outer surface of the at least one upper spindle nut. Correspondingly, there can be a spacer between an inner surface of the at least one lower receptacle and an outer surface of the at least one lower spindle nut. With this design, the spindle nut is therefore held with play in the respective receptacle. The receptacle can be a circular cylindrical receptacle, for example. Correspondingly then, the part of the spindle nut received in the circular cylindrical receptacle can also be circular cylindrical. The diameter of the part of the spindle nut received in the receptacle is somewhat smaller than the diameter of the receptacle. Then, a tipping between the force transmission element and the drive, in particular the spindle nut, and with it a partial decoupling is guaranteed by the spring element.

A bearing element can be provided arranged on the vertical spacers of the press frame between the upper and lower retaining plate of the press frame. The bearing element can be formed integrally for example. It is possible that the upper drive unit and/or the lower drive unit are arranged on the bearing element. The at least one upper drive unit and/or the at least one lower drive unit can be supported during operation at the bearing element in such a manner that the reaction forces, which are generated as action forces by the press forces produced during pressing of the powdered material in the at least one receptacle, are passed into the bearing element. The upper drive unit can be arranged between the bearing element and the upper press punch, or respectively an upper punch plate. Correspondingly, the lower drive unit can be arranged between the bearing element and the lower press punch, or respectively a lower punch plate, or the receptacle. The provision of such a bearing plate increases the overall stability of the press and reduces the influence of component tolerances or deformations during operation on the press result.

An upper fixed bearing of at least one upper spindle of at least one upper spindle drive can be fastened to the bearing element. Correspondingly, a lower fixed bearing of at least one lower spindle of at least one lower spindle drive can be fastened to the bearing element. It is also possible that an upper fixed bearing of at least one upper spindle of at least one upper spindle drive is fastened to the upper press punch, or respectively an upper punch plate, and/or that a lower fixed bearing of at least one lower spindle of the at least one lower spindle drive is fastened to the lower press punch, or respectively a lower punch plate, or the receptacle. As already explained, the at least one upper, or respectively lower, spindle nut can be fastened to the upper, or respectively lower, force transmission element using a flange connection, for example.

The receptacle of the pressing unit can be on the bearing element. As already mentioned, the receptacle can be formed in a die plate. The die plate can be formed separately from the bearing element and can be fastened, for example, to the bearing element. The upper and lower punch can then be movable relative to the bearing element, and thus the die plate with the receptacle. For particularly high stability, the bearing element can have a U-shape, which lies in a plane oriented perpendicular to the longitudinal axis of the press frame, in particular a horizontal plane.

Alternatively to an electric drive, it is also possible that the upper drive unit comprises at least one upper hydraulic or electrohydraulic drive motor, and/or that the at least one lower drive unit comprises at least one lower hydraulic or electrohydraulic drive motor.

The upper hydraulic drive motor can comprise at least one upper hydraulic cylinder fastened to the bearing element, wherein a piston rod of the at least one upper hydraulic cylinder acts on the upper force transmission element. Correspondingly, the lower hydraulic drive motor can comprise at least one lower hydraulic cylinder fastened to the bearing element, wherein a piston rod of the at least one lower hydraulic cylinder acts on the lower force transmission element. Alternatively, the upper hydraulic drive motor can comprise at least one upper hydraulic cylinder fastened to the upper force transmission element, wherein a piston rod of the at least one upper hydraulic cylinder is fastened to the bearing element. Correspondingly, the lower hydraulic drive motor can comprise at least one lower hydraulic cylinder fastened to the lower force transmission element, wherein a piston rod of the at least one lower hydraulic cylinder is fastened to the bearing element.

BRIEF DESCRIPTION OF THE DRAWINGS

An exemplary embodiment of the invention is explained in the following in more detail using the drawings, in which.

The same reference numbers refer to the same objects in the figures unless indicated otherwise.

DETAILED DESCRIPTION

Figure 1:
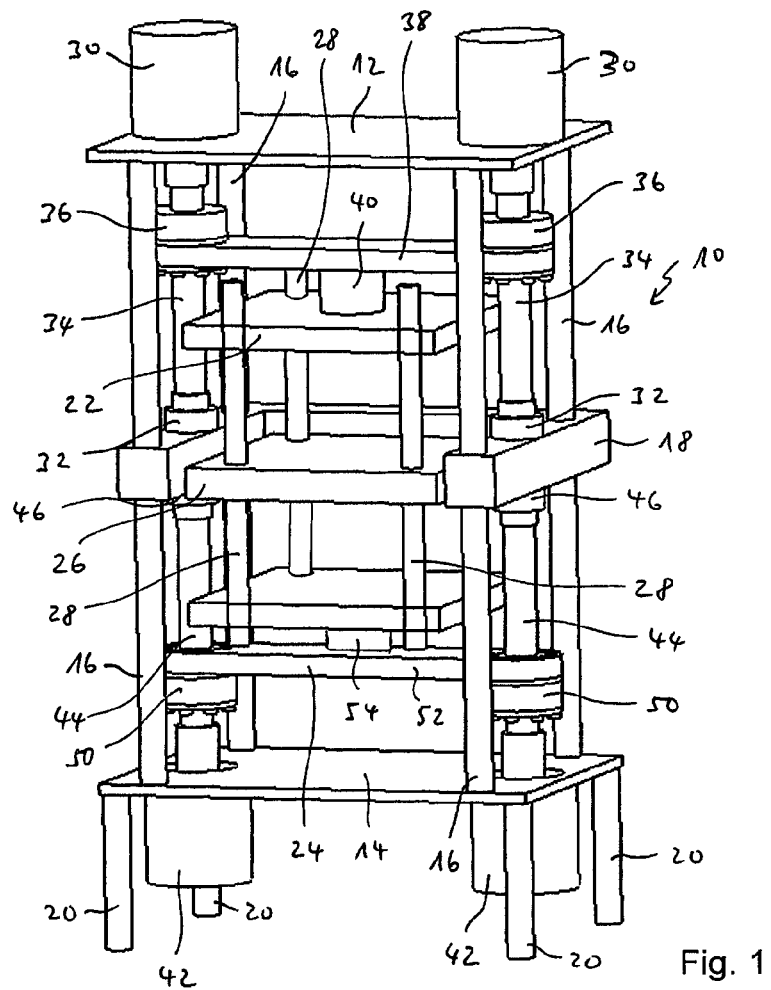
FIG. 1 is a schematic, perspective view of a press according to an embodiment of the invention.

A press according to the teachings herein has a press frame 10 with an upper retaining plate 12 and a lower retaining plate 14. The upper and lower retaining plates 12, 14 are connected to each other by means of four spacers 16, running in a vertical direction in the portrayed example, and to a bearing element 18 arranged approximately in the middle between the upper and lower retaining plate 12, 14. In this example, the bearing element 18 is formed integrally and has a U-profile lying in a horizontal plane, an arrangement plane, or an extension plane. The lower retaining plate 14 stands on the ground by means of four support legs 20. Furthermore, the press has an upper punch plate 22 with an upper punch, not shown, and a lower punch plate 24 with a lower punch, also not shown. A die plate 26 with a receptacle, not shown, for powder such as metal or ceramic powder to be pressed by the upper and lower punch, is arranged between the upper punch plate 22 and the lower punch plate 24. The upper punch plate 22, the lower punch plate 24, and the die plate 26 are connected to each other by means of vertical guide columns 28. In this example, the die plate 26 is directly attached to the bearing element 18.

The press as shown furthermore comprises two upper drive units for vertically moving the upper punch plate 22, and two lower drive units for vertically moving the lower punch plate 24. The upper and lower drive units are each arranged on opposite sides of the press frame 10. The upper drive units each comprise an upper electric drive motor 30 arranged on the upper retaining plate 12, and an upper spindle drive. In the portrayed example, an upper fixed bearing 32 of the upper spindle drive is fastened in each case directly to the top side of the bearing element 18. However, a fastening to the lower side is also possible. The electric drive motors 30 each rotatably drive an axially fixed upper spindle 34. An upper spindle nut 36 is arranged axially movable on each of the upper spindles 34. A rotation of the upper spindles 34 leads to an axial movement of the respective upper spindle nut 36. The upper spindle nuts 36 are fastened to opposite ends of an upper, bar-shaped force transmission bridge 38, which is itself connected in the middle to the upper punch plate 22 by means of a further force transmission element 40. The upper drive units with the upper drive motors 30 thereof therefore act laterally offset on the upper punch plate 22, and thus on the upper punch. In this manner, axial movement of the upper spindle nuts 36 is transmitted to the upper punch plate 22 such that the upper punch plate 22 is also moved in the vertical direction.

In this respect, the design of the two lower drive units is identical. Thus, the lower drive units each have a lower electric drive motor 42 arranged on the lower retaining plate 14, each of which drives an axially fixed lower spindle 44. In each case a lower fixed bearing 46 of the lower spindle drives is fastened directly to the lower side of the bearing element 18. However, fastening to the top side is also possible. In each case, an axially movable lower spindle nut 50 is in turn arranged on the lower spindles 44. The lower spindle nuts 50 are in turn attached on opposite ends of a lower, bar-shaped force transmission bridge 52, which in turn is connected in the middle to the lower punch plate 24 via another force transmission element 54. When the lower electric drive motors 42 rotatably drive the lower spindles 44, there is axial movement of the lower spindle nuts 50, which is transmitted to the lower punch plate 24 by means of the lower force transmission bridge 52 and the force transmission element 54 such that the punch plate is moved in a vertical direction. In turn, the lower electric drive units with lower electric drive motors 42 thereof act laterally offset on the lower punch plate 24, and thus on the lower punch.

It can be seen that the upper drive units are supported by means of the upper fixed bearings 32 thereof, and the lower drive units are supported by means of the lower fixed bearings 46 thereof directly on the bearing element 18. Thus, with a pressing procedure, force flows between the upper punch into the upper punch plate 22, from this via the upper force transmission element 40 and the upper force transmission bridge 38 into the two upper drive units, in particular, the upper spindles 34 and the upper fixed bearings 32 and from these into the bearing element 18. Correspondingly, force flows from the lower punch into the lower punch plate 24 and via the lower force transmission element 54 and the lower force transmission bridge 52, into the lower drive units, in particular the lower spindles 44 and the lower fixed bearings 46, and from these in turn into the bearing element 18. Thus only comparatively few components are located in the force flow such that correspondingly few component tolerances add up.

Because the arrangement plane of the bearing element 18 lies in the same horizontal plane as the die plate 26 or in a plane only slightly offset from this, and the vertical spacers 16 do not participate substantially in the force flow, there is not a significant deflection and thus bending of the press frame 10. Furthermore, the bearing element 18 absorbing the pressing forces can be manufactured precisely with low tolerances. The drive motors 30, 42 are not moved together with movement of the punch plate 22, 24.

However, bending of the force transmission bridges 38, or respectively 52, can occur due to the very high pressing forces arising during operation. Spring elements are provided according to the invention in order to prevent such a bending of the force transmission bridges 38, 52 leading to a tipping of the spindle nuts 36, 50, and with it to a misalignment of the spindle drives. This will be explained using the enlarged sectional representation in FIG. 2.

Figure 2:
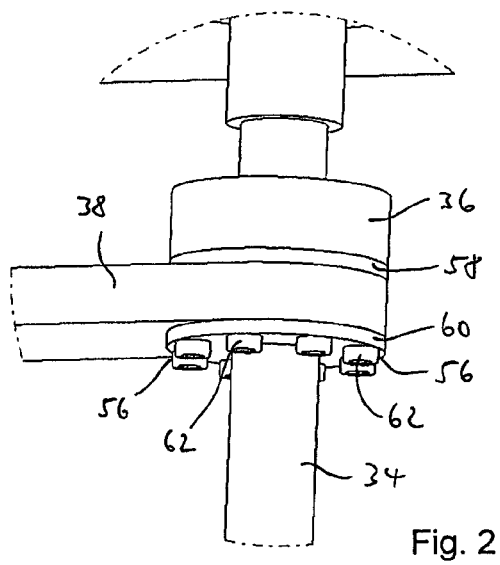
FIG. 2 is an enlarged detailed representation of a portion of the press from FIG. 1.

FIG. 2 shows the attachment of the upper spindle nut 36 to the force transmission bridge 38, seen on the right in FIG. 1. The attachment of the left upper spindle nut 36 in FIG. 1 to the upper force transmission bridge 38, as well as the attachment of the lower spindle nuts 50 to the lower force transmission bridges 52 are each largely identical such that references are made to the following explanation.

It can be seen in FIG. 2 that the spindle nut 36 simultaneously forms a flange, which is fastened to the upper force transmission bridge 38 using a plurality of fastening means, in this example, a plurality of threaded bolts 56. Naturally, instead of the threaded bolts 56 other fastening means are also conceivable. As shown, the threaded bolts 56 are placed through appropriate bore holes in the force transmission bridge 38, and screwed into the spindle nut 36. However it is also conceivable to place the threaded bolts 56 through appropriate bore holes in the spindle nut 36, and to screw them into the force transmission bridge 38. A first annular spring element 58, which forms a spacer between the spindle nut 36 and the force transmission bridge 38, is placed onto the threaded bolts 56. In addition, a second annular spring element 60, which forms a spacer between the heads 62 of the threaded bolts 56 and the upper force transmission bridge 38, is placed onto the threaded bolts 56. The spring elements 58, 60 can be disk springs or diaphragms, for example. They can consist of a metal material. Alternatively, it is also possible that they consist of a plastic, or a rubber compound.

In addition, the spindle nut 36 with a circular cylindrical attachment, not shown, is accommodated in a likewise circular cylindrical receptacle of the force transmission bridge 38. The outer diameter of the attachment is slightly smaller than the inner diameter of the receptacle of the force transmission bridge 38. The spindle nut 36 is held therefore with a small amount of play in the receptacle of the force transmission bridge 38. The attachment and with it the spindle nut 36 are held in the receptacle locked against rotation, using a tongue and groove connection, not shown. For example, a tongue, in particular, can extend in the axial direction on the outer periphery of the attachment. A corresponding groove, extending in an axial direction, is then formed in the receptacle of the force transmission bridge 38. Naturally, it is also possible that a groove extends in an axial direction on the outer periphery of the attachment. Then, a corresponding tongue, extending in an axial direction, is formed in the receptacle of the force transmission bridge 38. Here, the tongue and groove can be formed on a peripheral section of the receptacle, or respectively the attachment that lies on the central longitudinal axis of the force transmission bridge 38.

If, during a pressing procedure, a bending of the force transmission bridge 38 arises, this leads therefore to a corresponding elastic deformation of the spring elements 58, 60. This elastic deformation of the spring elements 58, 60 leads to a decoupling between the force transmission bridge 38 and the spindle nut 36, to the effect that the bending of the force transmission bridge 38 does not lead to a tipping of the spindle nuts 36. Moreover, the bending of the force transmission bridge 38 is absorbed by the deforming spring elements 58, 60, such that the spindle nut 36 continues to retain the intended alignment thereof, and the spindle 34 is guided in the spindle nut 36 without twisting. The accommodation of the spindle nut 36 with little play in the force transmission bridge 38 and the tongue and groove connection allow a corresponding relative movement between the outer ends of the force transmission bridge 38 and the respective spindle nut 36. In addition, due to the provision of the spring elements 58, 60, there is an equalization of possibly present twisting between the upper and/or lower drive units due to mechanical tolerances, for example. As a result, the wear of the press is further reduced.

It should be mentioned that with the connections of the lower spindle nuts 50 to the lower force transmission bridge 52, the threaded bolts 56 extend through appropriate bore holes of the lower spindle nuts 50 and are screwed into the lower force transmission bridge 52. This is due to the fact that the lower spindle nuts 50 are arranged beneath the lower force transmission bridge 52, whereas the upper spindle nuts 36 are arranged above the upper force transmission bridge 38 (see FIG. 1). However, it is also pointed out that it is also possible to screw the lower threaded bolts into the lower threaded nuts. Correspondingly, it is also possible to screw the upper threaded bolts into the upper force transmission bridge. In addition, as already explained, the connection between the lower spindle nuts 50 and the lower force transmission bridge 52 is identical to the connection of the upper spindle nuts 36 to the upper force transmission bridge 38. Correspondingly, the function described above of the respectively provided spring elements is also identical.

The invention claimed is:

1. A press for producing a pellet from powdered material comprising
   a press frame; and
   a pressing unit arranged in the press frame, the pressing unit having:
      at least one receptacle for the powdered material to be pressed; and
      at least one of:
         an upper press punch associated with an upper drive unit having at least one upper drive motor for moving the upper press punch in the vertical direction, wherein the upper drive unit acts laterally offset on the upper press punch via an upper force transmission element, and at least one upper spring element, deforming during a pressing procedure of the powdered material, is arranged between the at least one upper force transmission element and the upper drive unit; or
         a lower press punch associated with a lower drive unit having at least one lower drive motor for moving at least one of the lower press punch or the receptacle in the vertical direction, wherein the lower drive unit acts laterally offset on the at least one of the lower press punch or the receptacle via a lower force transmission element, and at least one lower spring element, deforming during the pressing procedure of the powdered material, is arranged between the at least one lower force transmission element and the lower drive unit.

2. The press according to claim 1, wherein the press frame has an upper retaining plate and a lower retaining plate that are connected together by a plurality of vertical spacers.

3. The press according to claim 2, wherein at least one of:
   the at least one drive motor of the upper drive unit is fastened to the upper retaining plate of the press frame; or
   the at least one drive motor of the lower drive unit is fastened to the lower retaining plate of the press frame.

4. The press according to claim 1, wherein at least one of:
the upper force transmission element comprises an upper force transmission bridge extending in the horizontal direction; or
the lower force transmission element comprises a lower force transmission bridge extending in the horizontal direction.

5. The press according to claim 1, wherein the upper drive unit comprises at least two upper drive units, each having a respective upper drive motor, wherein each upper drive motor acts laterally offset on the upper press punch via the upper force transmission element, and the at least one upper spring element is arranged between the upper force transmission element and the at least two upper drive units.

6. The press according to claim 5, wherein the at least two upper drive units engage at opposite ends of the upper force transmission bridge.

7. The press according to claim 1, wherein the lower drive unit comprises at least two lower drive units, each having a respective lower drive motor, wherein each lower drive motor acts laterally offset on the at least one of the lower press punch or the receptacle via the lower force transmission element, and the at least one lower spring element is arranged between the lower force transmission element and the at least two lower drive units.

8. The press according to claim 7, wherein the at least two lower drive units engage at opposite ends of the lower force transmission bridge.

9. The press according to claim 1, wherein an upper flange of the upper drive unit is connected to the upper force transmission element via a plurality of fastening means, and wherein the at least one upper spring element is a first upper spring element that forms a spacer between the upper flange and the upper force transmission element and is placed on the plurality of fastening means.

10. The press according to claim 9, wherein the at least one upper spring element comprises a second upper spring element that forms a spacer between the plurality of fastening means and the upper flange or between the plurality of fastening means and the upper force transmission element, and is placed on the plurality of fastening means.

11. The press according to claim 1, wherein a lower flange of the lower drive unit is connected to the lower force transmission element via a plurality of fastening means, and wherein the at least one lower spring element comprises a first lower spring element that forms a spacer between the lower flange and the lower force transmission element and is placed on the plurality of fastening means.

12. The press according to claim 11, wherein the at least one lower spring element comprises a second lower spring element that forms a spacer between the plurality of fastening means and the lower flange or between the plurality of fastening means and the lower force transmission element and is placed on the plurality of fastening means.

13. The press according to claim 1, wherein at least one of:
the at least one upper drive motor of the upper drive unit is at least one electric drive motor and at least one upper spindle drive having an upper spindle nut and driven by the at least one electric drive motor; or
the at least one lower drive motor of the lower drive unit is at least one electric drive motor and at least one lower spindle drive having a lower spindle nut and driven by the at least one electric drive motor.

14. The press according to claim 13, wherein at least one of:
an upper flange of the upper drive unit is connected to the upper force transmission element via a plurality of fastening means, and wherein the at least one upper spring element is a first upper spring element that forms a spacer between the upper flange and the upper force transmission element and is placed on the plurality of fastening means, and wherein the upper flange is a flange of the upper spindle nut; or
a lower flange of the lower drive unit is connected to the lower force transmission element via a plurality of fastening means, and wherein the at least one lower spring element is a first lower spring element that forms a spacer between the lower flange and the lower force transmission element and is placed on the plurality of fastening means, and wherein the lower flange is a flange of the lower spindle nut.

15. The press according to claim 13, wherein at least one of:
the upper spindle nut is held locked against rotation in at least one upper receptacle of the upper force transmission element; or
the lower spindle nut is held locked against rotation in at least one receptacle of the lower force transmission element.

16. The press according to claim 15, wherein at least one of:
a space exists between an inner surface of the at least one upper receptacle and an outer surface of the upper spindle nut; or
a space exists between an inner surface of the at least one lower receptacle and an outer surface of the lower spindle nut.

17. The press according to claim 2, further comprising:
a bearing element arranged on the plurality of vertical spacers of the press frame between the upper retaining plate and the lower retaining plate.

18. The press according to claim 17, wherein the at least one receptacle is arranged on the bearing element.

19. The press according to claim 17, wherein the bearing element has a U-shape which lies in a plane oriented perpendicular to the longitudinal axis of the press frame.

20. The press according to claim 1, wherein at least one of:
the upper drive unit comprises at least one upper hydraulic or electrohydraulic drive motor; or
the at least one lower drive unit comprises at least one lower hydraulic or electrohydraulic drive motor.

* * * * *